May 5, 1953          E. C. ADKINS          2,637,200

PNEUMATIC GAUGING DEVICE

Filed Sept. 18, 1948

INVENTOR.
Earl C. Adkins
BY Edward J. Noe Jr.
atty

Patented May 5, 1953

2,637,200

UNITED STATES PATENT OFFICE 2,637,200

PNEUMATIC GAUGING DEVICE

Earl C. Adkins, Dayton, Ohio, assignor to The Sheffield Corporation, Dayton, Ohio, a corporation of Ohio Application September 18, 1948, Serial No. 49,917

2 Claims. (Cl. 73—37.5)

This invention relates to gauging devices for determining or comparing a dimension of a workpiece and in which a fluid flow obtains through a leakage path between the workpiece and the gauging element to determine the dimension of the workpiece.

One object of the invention is the provision of a gauging device of the character mentioned having an insert of superior hardness and wear-resistant qualities and in which the insert is an integral bar which acts as a work engaging surface and which additionally provides a gauging surface around the end of a hole through the bar and in which there is also provision such as a channel around the gauging surface for relieving the fluid passing through the hole.

Another object is the provision of a gauging device having a body member of iron or steel and having a cemented carbide insert which projects outwardly of the body member, such insert being an integral bar providing body guiding portions adapted for contact with the work and providing a gauging surface over which fluid leakage takes place, the leakage being relieved through a channel formed in the insert and flowing through a channel extension to an edge portion of the bar.

Other objects and advantages of the invention will be apparent from the following description, the appended claims and the accompanying drawing, in which, Fig. 1 is a side view of a gauging apparatus embodying the present invention;

Figure 1:
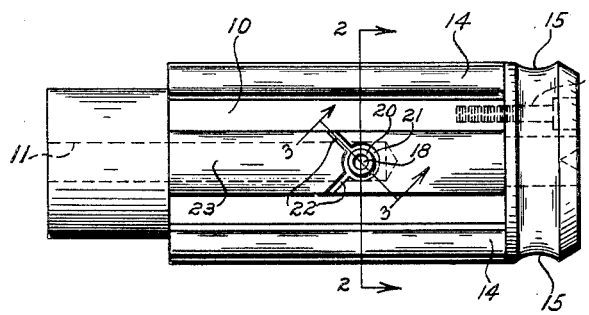
Figure 2:
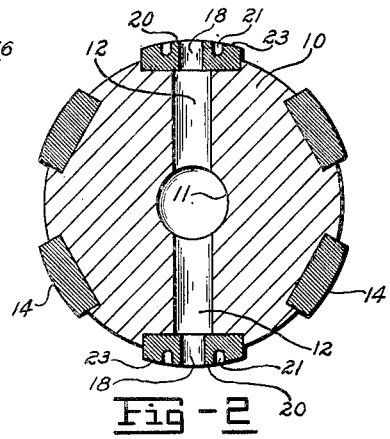
Fig. 2 is a sectional view, on an enlarged scale, of the line 2—2 of Fig. 1.

Referring more particularly to the drawing, a preferred form of the invention has been illustrated in its application to a plug gauge adapted for insertion in a workpiece to determine a dimension, such as the diameter of the workpiece. 10 designates a body portion of generally cylindrical shape having a fluid passage adapted to be connected to a source of fluid under pressure and a fluid measuring means by which the flow through the passage can be indicated or measured. Such fluid passage includes a central axially extending hole 11 and lateral or branch portion 12, the hole 11 being blind at the end of the body portion which is adapted to enter the workpiece, namely the right hand end of the gauging device as illustrated in Fig. 1, so that all the air or other fluid supplied to the passage 11 will flow out through the branch passages 12.

Figure 4:
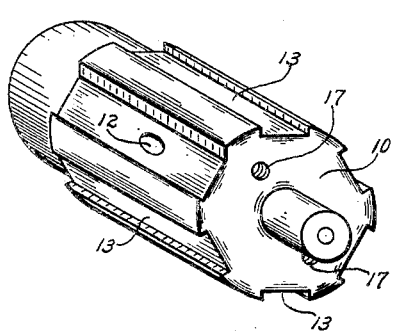
Fig. 4 is a perspective view illustrating the body member before the application of the insert strips.

The body portion is axially slotted as indicated at 13 in Fig. 4 and in each slot is a strip or bar 14 of a material having superior hardness and wear-resistant qualities compared to the body portion. These strips or bars extend outwardly of the body portion and form guide members adapted for contact with the work. The body portion is formed of ferrous material such as iron or steel, and the insert strips or bars are of cemented carbide such as the carbide of tungsten, titanium, tantalum, boron or the like, molded and sintered. These strips or bars are fixed securely in place in the slots in the body portion by brazing or soldering, or, in the case of boron carbide, by cementing. After they are secured in place the outer surface of all the bars is surfaced as by a grinding operation so that the diameter of the outer surface defined by the bars is slightly smaller than the diameter of the hole to be checked in the workpiece. The entering end of the gauging apparatus may be protected by a front cap 15 secured in place by one or more screws 16 which enter threaded holes 17 in the body portion.

Figure 5:
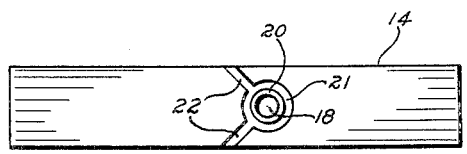
Fig. 5 is a detail view of the preformed insert of hard material.
Figure 3:
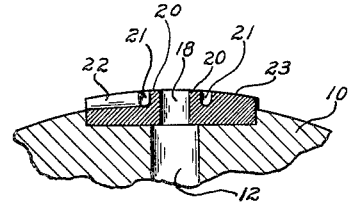
Fig. 3 is a fragmentary section, on an enlarged scale, taken on the line 3—3 of Fig. 1.
Figure 6:
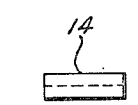
Fig. 6 is an end view of the preformed insert.

The two sintered carbide bars that are arranged in the slots provided adjacent opposite ends of the branch passages 12 in the body member are of similar construction. Each is made as a preformed member of such length and breadth as to afford an adequate work guiding surface, with a suitable channel and a hole or perforation 18 so that the only finishing operation required on the outer surface of the insert after it is bonded in place is a sizing operation which cylindrically forms the outer surface to the exact size required and which properly forms the gauging surface itself which extends around the fluid leakage hole. Figs. 5 and 6 show one of these preformed members before it is applied to the body member, the upper surface being preferably flat and spaced far enough from the lower surface to leave a small amount of material to be removed in the sizing operation after the member is applied to the body member. This hole 18 in the bar 14, extending radially of the gauging device, has a diameter somewhat less than the diameter of the branch passage 12 so that the hole 18 will completely register with the branch passage in the body member so that extreme accuracy is not required in the manufacturing tolerances in constructing the insert. Surrounding the hole 18 is a gauging surface 20 defined by a channel 21 preformed in the insert, channel 21 being in communication with one or more branch grooves or channels 22 extending to the edge or edges of the bar. The channel 21 lies entirely within the length and breadth of the bar so that a guiding surface of adequate extent is afforded for contact with the work, but the channel 21 and the branch channels 22 permit the free relief of the leakage fluid that flows out through the passages 12 and 18 and through the restricted space between the workpiece and the gauging surface 20. It is understood that the amount of fluid leakage through the hole 18 and out over the gauging surface 20 depends upon the spacing between that surface and the workpiece so that by measuring the flow of fluid taking place, the workpiece can be compared to a standard part by comparing the readings obtained on the indicating instrument.

It will be apparent that the cost of construction of a gauging device having preformed inserts which afford a work guiding surface and also provide the work gauging surface and the relief channel itself is very much reduced by the use of a preformed insert which may be readily molded or otherwise formed completely except for the outer sizing that must be done after the insert is applied and brazed or soldered in place. The construction affords a gauging surface 20 of extremely hard wear-resisting material so that the abrasive effect on the gauging surface 20 caused by tiny particles in the fluid flow over the surface or caused by particles or chips on the workpiece rubbing against the gauging surface is greatly reduced and the gauging surface retains its exact size over a very long active life. The construction of the gauging nozzle, that is the hole 18 and the surrounding gauging surface 20, as an integral part of the bar which extends along all sides of the gauging nozzle and protects the gauging nozzle from direct application to the work and from shocks further increases the active life of the gauging device.

It will be understood that after the bar 14 is brazed or soldered in place, it is then merely necessary to grind the outer surface of the bar to give it a cylindrical curvature, as indicated at 23, of the proper diameter, and after this has been done the gauging surface itself is further ground to give it a cylindrical surface concentric with the surface 23 but depressed slightly below the level of that surface 23 so that the gauging surface 20 thus formed does not touch the work even though the surrounding surface 23 may be in full contact with the work.

While the form of apparatus herein described constitutes preferred embodiments of the invention, it is to be understood that the invention is not limited thereto, and that changes may be made therein without departing from the scope of the invention which is defined in the appended claims.

What is claimed is:

1. Gauging apparatus for comparing the size of a workpiece with a standard, comprising a generally cylindrical body portion having a fluid passage adapted for communication with a fluid supply and fluid measuring means, a plurality of annularly spaced axially extending strips fixed on said body portion and having superior hardness and wear-resistant qualities compared to the body portion and arranged to space the body portion from the workpiece surface, at least one of said strips comprising a molded bar having a hole in communication with the passage in the body portion, said bar having a channel around said hole with the bar portions inside said channel providing around the hole a cylindrically formed gauging surface which is slightly offset radially of the body portion from the outer surface of the surrounding portions of the bar, the size of said channel being such it lies entirely within the width and length of the bar, said bar having a surface groove extending from said channel to an edge of the bar.

2. Gauging apparatus for comparing the size of a workpiece with a standard, comprising a body portion having a fluid passage adapted for communication with a fluid supply and fluid measuring means, a plurality of laterally spaced axially extending strips fixed on said body portion partly recessed therein and projecting outwardly therefrom, at least one of said strips comprising a molded bar of sintered carbide having a hole in communication with the passage in the body portion, said bar having a channel around said hole with the bar portions inside said channel providing around said hole a gauging surface which is slightly depressed below the adjacent surface of the bar, said bar having a surface groove extending from said channel to an edge of the bar.

EARL C. ADKINS.

References Cited in the file of this patent

UNITED STATES PATENTS

| Number | Name | Date |
|---|---|---|
| 2,320,993 | Worner | June 8, 1943 |
| 2,358,769 | Aller | Sept. 19, 1944 |
| 2,360,058 | Hohwart | Oct. 10, 1944 |
| 2,360,705 | Moore | Oct. 17, 1944 |
| 2,370,219 | Aller | Feb. 27, 1945 |
| 2,397,084 | Bernhart | Mar. 26, 1946 |
| 2,529,170 | Mennesson | Nov. 7, 1950 |